(12) United States Patent
Noh

(10) Patent No.: US 6,780,544 B2
(45) Date of Patent: Aug. 24, 2004

(54) POLYMERIC GEL ELECTROLYTE AND LITHIUM BATTERY EMPLOYING THE SAME

(75) Inventor: Hyung-gon Noh, Seoul (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 285 days.

(21) Appl. No.: 09/855,838

(22) Filed: May 16, 2001

(65) Prior Publication Data

US 2002/0018937 A1 Feb. 14, 2002

(30) Foreign Application Priority Data

Jun. 22, 2000 (KR) .............................. 00-34505

(51) Int. Cl.[7] .............................................. H01M 10/40

(52) U.S. Cl. ........................ 429/303; 429/300; 252/62.2

(58) Field of Search ................................ 429/300, 303; 252/62.2

(56) References Cited

U.S. PATENT DOCUMENTS 5,639,573 A * 6/1997 Oliver et al. ................ 429/303
6,162,563 A * 12/2000 Miura et al. ................. 429/309

* cited by examiner

Primary Examiner—Carol Chaney
(74) Attorney, Agent, or Firm—Staas & Halsey LLP

(57) ABSTRACT

A lithium battery including an electrode assembly having a cathode, an anode, a separator interposed between the cathode and the anode, a gel electrolyte prepared by dissolving a terpolymer having a repeating unit represented by formula (1), a repeating unit represented by formula (2) and a repeating unit represented by formula (3) in an organic solvent having a low boiling point, mixing a lithium salt and organic solvent therewith to obtain a composition for forming an electrolyte, injecting the composition into a case accommodating the electrode assembly or coating on at least one of the cathode, the anode and the separator, and then removing the low boiling point organic solvent from the resultant structure, and the pouch accommodating the electrode assembly and the gel electrolyte:

Formula 1
$$-\!\!-\!(CH_2CH_2O)-\!\!-$$

Formula 2
$$-\!\!-\!(CH_2CHO)-\!\!-$$
$$\phantom{-\!\!-\!(CH_2C}|$$
$$\phantom{-\!\!-\!(CH_2C}CH_2$$
$$\phantom{-\!\!-\!(CH_2C}|$$
$$\phantom{-\!\!-\!(CH_2C}O(CH_2CH_2O)_nR$$

Formula 3
$$-\!\!-\!(CH_2CHO)-\!\!-$$
$$\phantom{-\!\!-\!(CH_2C}|$$
$$\phantom{-\!\!-\!(CH_2C}CH_2OCH_2CH\!=\!CH_2$$

wherein n is an integer from 1 to 12 and R is an alkyl having 1 to 12 carbon atoms. The lithium battery, which can prevent the reliability and safety of the battery from lowering, can be attained by using a gel electrolyte by which a swelling phenomenon due to an electrolytic solution can be effectively suppressed and leakage of the electrolytic solution can be prevented.

23 Claims, 2 Drawing Sheets

US 6,780,544 B2

POLYMERIC GEL ELECTROLYTE AND LITHIUM BATTERY EMPLOYING THE SAME

CROSS REFERENCE

This application claims the benefit of Korean Patent Application No. 00-34505, filed Jun. 22, 2000, in the Korean Industrial Property Office, the disclosure of which are incorporated herein by reference.

BACKGROUND OF THE INVENTION

1. Field of the Invention

The present invention relates to a polymeric gel electrolyte and a lithium battery employing the same, and more particularly, to a polymeric gel electrolyte and a lithium battery having improved reliability and safety by using the polymeric gel electrolyte.

2. Description of the Related Art

As it has been known that ionic conductivity characteristics have improved when an ethylene oxide homopolymer and an alkali metal ion system are employed, a polymer solid electrolyte has been intensively researched. As a result of this research, much attention has been paid to polyether, such as polyethylene oxide, as a polymer matrix with respect to high movement freedom and solubility of a metallic cation.

The movement of metal ions occurs at an amorphous area of polymer rather than at a polymer crystalline area of a polymer. Thus, in order to reduce the crystallizability of polyethylene oxide, methods of copolymerizing polyethylene oxide with various epoxide compounds have been proposed (U.S. Pat. Nos. 5,968,681 and 5,837,157).

Lithium secondary batteries are classified according to the kind of electrolyte used, into lithium ion batteries and lithium ion polymer batteries. The lithium ion batteries generally use a cylindrical case or prismatic case as the case for sealing an electrode assembly. However, recently, a pouch has been in widespread use instead of cases, such as ones discussed above. The reason for using a pouch for sealing an electrode assembly instead of a case is that as the energy density per unit weight and volume increases, thin and lightweight batteries can be attained, and the material cost for sealing the electrode assembly can be reduced.

FIG. 1 is an exploded perspective view showing an example of a lithium ion battery using a pouch instead of a case.

Referring to FIG. 1, a lithium ion battery includes an electrode assembly 10 having a cathode 11, an anode 12, a separator 13, and a pouch 14 surrounding and hermetically sealing the electrode assembly 10. Here, the electrode assembly 10 is formed such that the separator 13 is interposed between and wound up with the cathode 11 and the anode 12. A cathode tap 12 and an anode tap 12', serving as electrical passageways between the electrode assembly 10 and the outside, are drawn from the cathode 11 and the anode 12, respectively, to form electrode terminals 13 and 13'.

FIG. 2 is an exploded perspective view showing an example of a conventional lithium ion polymer battery.

Referring to FIG. 2, the lithium ion polymer battery includes an electrode assembly 21 having a cathode, an anode, a separator, and a pouch 22 surrounding and hermetically sealing the electrode assembly 21. Electrode terminals (or lead wires) 24 and 24', serving as electrical passageways for inducing the current formed at the electrode assembly 21 to the outside, are connected to a cathode tap 23 and an anode tap 23', which are provided at the cathode and the anode, respectively, and are exposed outside the pouch 22 by a predetermined length.

As described above, in the lithium ion battery shown in FIG. 1 and the lithium ion polymer battery shown in FIG. 2, the electrode assemblies 10 and 21 are put into the pouches 14 and 22 and an electrolytic solution is injected thereto, with the electrode terminals 13 and 13' and 24 and 24', respectively, being partially exposed. Then, heat and pressure are applied so that the thermally adhesive materials in the edges of upper and lower pouch parts are adhered to be sealed, thereby completing the battery.

As described above, since the electrolytic solution is injected after the electronic assemblies are put into the pouches, in the case of using an organic solvent having a low melting point, the electrode assembly or pouch may swell, resulting in deterioration in the reliability and safety of the battery.

To solve the above-described problems, there have been proposed several methods of fabricating batteries such that electrodes and electrolyte may be prepared by curing, by way of by UV rays or electron beams. Alternatively, electrode plates may be coated with gel without separately injecting an electrolytic solution, as disclosed in U.S. Pat. Nos. 5,972,539, 5,279,910, 5,437,942 and 5,340,368. In practice, swelling of an electrode assembly or pouch can be somewhat mitigated, which is, however, not yet satisfiable.

To solve the above-described problems, the present inventor has carried out various researches and completed the present invention relating to a gel electrolyte formed by using a polyethylene oxide polymer.

SUMMARY OF THE INVENTION

Accordingly, it is an object of the present invention to provide a polymeric gel electrolyte which can effectively suppress swelling of a battery due to an electrolytic solution.

It is another object of the present invention to provide a lithium battery which can prevent the reliability and safety of the battery from lowering due to swelling of the battery due to an electrolytic solution by using the polymeric gel electrolyte.

It is yet another object of the present invention to provide a method of manufacturing the lithium battery.

Additional objects and advantages of the invention will be set forth in part in the description which follows and, in part, will be obvious from the description, or may be learned by practice of the invention.

To achieve the above and other objects, there is provided a polymeric gel electrolyte prepared by dissolving a terpolymer having a repeating unit represented by formula (1), a repeating unit represented by formula (2) and a repeating unit represented by formula (3) in an organic solvent having a low boiling point, mixing a lithium salt and organic solvent therewith to obtain a composition for forming an electrolyte, and then removing the low boiling point organic solvent from the composition:

Formula 1

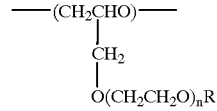

Formula 2

-continued

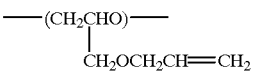

Formula 3 wherein n is an integer from 1 to 12 and R is an alkyl having 1 to 12 carbon atoms.

Preferably, the content of the repeating unit represented by formula (1) is about 0.1 to 0.9 mol, the content of the repeating unit represented by formula (2) is about 0.1 to 0.8 mol, and the content of the repeating unit represented by formula (3) is about 0.01 to 0.8 mol.

To achieve the object of providing a lithium battery using a polymeric gel electrolyte, there is provided a lithium battery including an electrode assembly having a cathode, an anode a separator interposed between the cathode and the anode, a polymeric gel electrolyte prepared by dissolving the terpolymer having a repeating unit represented by formula (1), a repeating unit represented by formula (2) and a repeating unit represented by formula (3) in a low boiling point organic solvent, mixing a lithium salt and an organic solvent therewith to obtain a composition for forming an electrolyte, injecting the composition into a case for accommodating an electrode assembly or coating the composition on at least one of the cathode, the anode and the separator, and removing only the low boiling point organic solvent from the resultant structure, and a case for accommodating the electrode assembly and polymeric electrolyte:

Formula 1

Formula 2

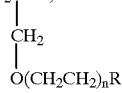

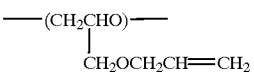

Formula 3 wherein n is an integer from 1 to 12 and R is an alkyl having 1 to 12 carbon atoms.

To achieve the object of providing a method of manufacturing a lithium battery, there is provided a composition for forming an electrolyte by dissolving a terpolymer having a repeating unit represented by formula (1), a repeating unit represented by formula (2) and a repeating unit represented by formula (3) in a low boiling point organic solvent, and mixing a lithium salt and an organic solvent therewith, injecting the composition into a case accommodating an electrode assembly having a cathode, an anode and a separator, and removing the low boiling point organic solvent from the resultant structure to obtain a polymeric gel electrolyte to then be hermetically sealed:

Formula 1

Formula 2

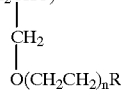

-continued

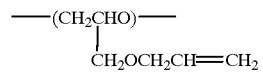

Formula 3 wherein n is an integer from 1 to 12 and R is an alkyl having 1 to 12 carbon atoms.

Also, to achieve the this object, there is provided a composition for forming an electrolyte by dissolving a terpolymer having a repeating unit represented by formula (1), a repeating unit represented by formula (2) and a repeating unit represented by formula (3) in a low boiling point organic solvent, and mixing a lithium salt and an organic solvent therewith;

coating the composition on at least one of a cathode, an anode and a separator; and forming an electrode assembly using the cathode, anode and separator, removing the low boiling point organic solvent from the resultant structure to obtain a polymeric gel electrolyte to then be hermetically sealed:

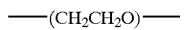

Formula 1

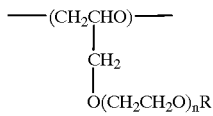

Formula 2

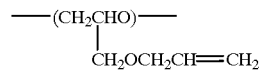

Formula 3 wherein n is an integer from 1 to 12 and R is an alkyl having 1 to 12 carbon atoms.

The low boiling point organic solvent includes acetone, tetrahydrofuran and the like.

BRIEF DESCRIPTION OF THE DRAWINGS

These and other objects and advantages of the present invention will become apparent and more readily appreciated from the following description in detail of a preferred embodiment thereof with reference to the attached drawings in which.

DESCRIPTION OF THE PREFERRED EMBODIMENT

Figure 1:
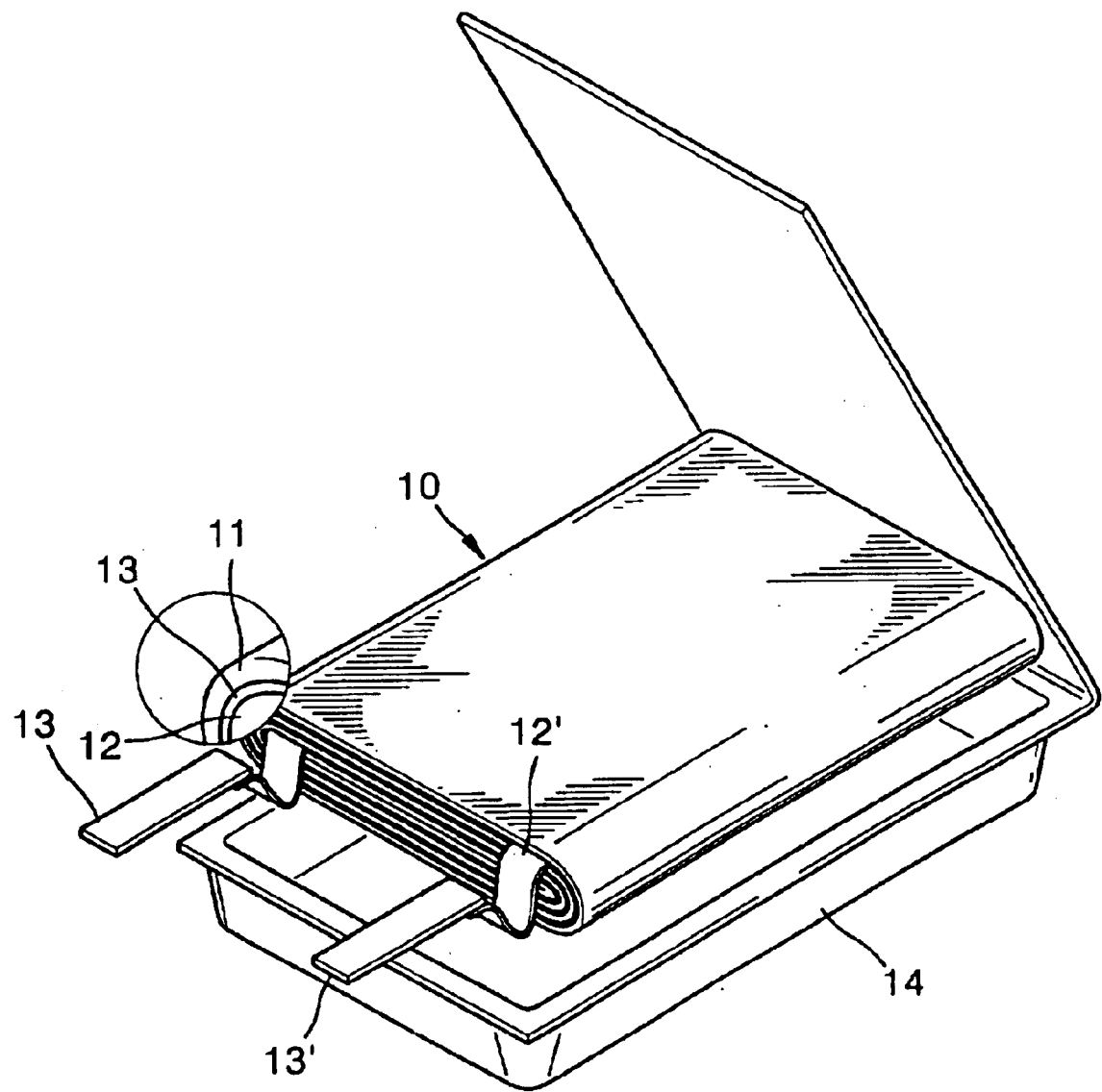
FIG. 1 is a partially exploded perspective view illustrating an example of a general lithium ion battery.

Reference will now be made in detail to the present preferred embodiments of the present invention, examples of which are illustrated in the accompany drawings, wherein like reference numerals refer to the like elements throughout. The embodiments are described below in order to explain the present invention by referring to the figures.

The feature of the present invention lies in that a polymeric gel electrolyte is used, and the gel electrolyte can be prepared by the following methods.

First, a terpolymer having a repeating unit represented by formula (1), a repeating unit represented by formula (2) and a repeating unit represented by formula (3) is dissolved in an organic solvent having a low boiling point the lithium salt and organic solvent are added thereto to adjust the viscosity, injected into a pouch incorporating an electrode assembly, and then the low boiling point organic solvent is evaporated for removal.

Second, a terpolymer having a repeating unit represented by formula (1), a repeating unit represented by formula (2) and a repeating unit represented by formula (3) is dissolved in an organic solvent having a low boiling point the lithium salt and organic solvent are added thereto and mixed to obtain a composition, the composition is coated on at least one of a cathode, an anode and a separator, and then the low boiling point organic solvent is removed.

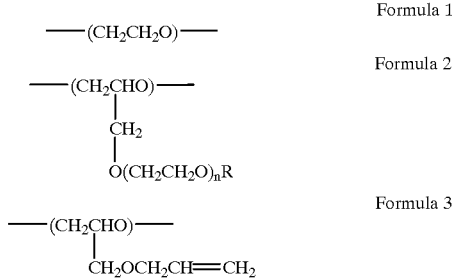

In the above formulas, n is an integer from 1 to 12 and R is an alkyl having 1 to 12 carbon atoms.

Detailed examples of R represented by the formula (2) include a methyl group, an ethyl group and the like.

In the terpolymer, the content of the repeating unit of the formula (1) is about 0.1 to 0.9 mol, the content of the repeating unit of the formula (2) is about 0.1 to 0.8 mol, and the content of the repeating unit of the formula (3) is about 0.01 to 0.8 mol. Also, the weight-average molecular weight of the terpolymer is preferably within the range from about 10,000 to 2,000,000, and more preferably, from about 500,000 to 1,200,000. When the weight-average molecular weight of the terpolymer is out of this range, the terpolymer may be unfavorably difficult to dissolve. The glass transition temperature of the terpolymer is preferably within the range from about −80 to 30° C.

In particular, the lithium battery according to the present invention is not specifically restricted in its shape and may be any lithium batteries, including a lithium primary battery and a lithium secondary battery, such as a lithium ion battery or a lithium ion polymer battery. Specifically, the lithium battery having a wound type electrode assembly and a pouch type case incorporating the electrode assembly is preferred. If the pouch is used as a case, the energy density per weight and energy density per volume increases and thin, light-weight batteries can be attained. Furthermore, the material cost for the pouch can be reduced.

The process of preparing a gel electrolyte according to the present invention using a terpolymer having repeating units represented by formulas (1), (2) and (3), will now be described in detail.

First, a terpolymer having a repeating unit represented by formula (1), a repeating unit represented by formula (2) and a repeating unit represented by formula (3) is dissolved in an organic solvent having a low boiling point, such as acetone, tetrahydrofuran and the like.

Subsequently, an electrolytic solution containing a lithium salt and organic solvent are added to a solution containing the terpolymer and the low boiling point solvent and then mixed to obtain a composition for forming an electrolyte. Here, the weight of the terpolymer and the total weight of the lithium salt and organic solvent are preferably within the range from about 1:1 to 1:50. When the content of the terpolymer relative to the lithium salt and organic solvent exceeds the range, the ionic conductivity is lowered. If the content of the terpolymer relative to the lithium salt and organic solvent falls short of the range, the physical property of the resulting polymeric gel electrolyte may be unfavorably weak.

Thereafter, the electrolyte forming composition is injected into a case accommodating an electrode assembly, and then only the low boiling point organic solvent is quickly removed under a vacuum condition. Then, the resulting polymeric gel electrolyte may be obtained.

Alternatively, the polymeric gel electrolyte obtained in the above-described process may be obtained by coating the electrolyte forming composition on at least one of a cathode, an anode and a separator, and then removing only the low boiling point organic solvent.

The organic solvent for the electrolytic solution of the present invention is at least one carbonate-based solvent selected from the group consisting of propylene carbonate (PC), ethylene carbonate (EC), dimethylcarbonate (DMC), methylethylcarbonate (MEC), diethylcarbonate (DEC) and vinylene carbonate (VC). In particular, in the case of adding VC as the organic solvent for the electrolytic solution, the performance, particularly, the lifetime performance of a battery is improved. As the lithium salt, at least one ionic lithium salt is selected from the group consisting of $LiClO_4$, $LiBF_4$, $LiPF_6$, $LiCF_3SO_3$, $LiN(CF_3SO_2)_2$.

A method for preparing a lithium battery containing the gel electrolyte according to the present invention will now be described.

First, an electrode active material layer is formed on a current collector using an electrode active material composition comprising an electrode active material, a binder, a conductive agent and a solvent. Here, the electrode active material layer may be formed such that the electrode active material composition may be directly coated on the current collector, or alternatively, the electrode active material composition may be coated on a separate support body and dried, in which a film, peeled off from the support body, is then laminated on the current collector. Here, as the support body, any material that can support the active material layer may be used, and detailed examples thereof include a mylar film and a polyethylene terephthalate (PET) film.

In the present invention, a lithium composite oxide, such as $LiCoO_2$, may be used as the electrode active material for a cathode and carbon, or graphite may be used as the electrode active material for an anode. As the conductive agent, carbon black or the like can be used. Here, the content of the conductive agent is preferably about 1 to 20 parts by weight based on 100 parts by weight of the electrode active material, e.g., $LiCoO_2$. When the content of the conductive agent is smaller than 1 parts by weight, the conductivity improving effect of the electrode active material layer and the current collector may be negligible. When the content of the conductive agent is greater than 20 parts by weight, the content of the electrode active material is relatively reduced.

As the binder, vinylidenefluoride-hexafluoropropylene (VdF/HFP) copolymer, polyvinylidenefluoride, polyacrylonitrile, polymethylmethacrylate and mixtures thereof may be used, and the content thereof is preferably about 5 to 30 parts by weight based on 100 parts by weight of the electrode active material. When the content of the binder is within this range, the adhesion between the current collector and the electrode active material layer is excellent.

All solvents for use in the conventional lithium secondary battery can be used as the solvent, and detailed examples thereof include acetone and N-methylpyrrolidone.

In some cases, in order to improve the performance of a battery, in particular, the high rate performance of a battery, $Li_2CO_3$ may be further added to the electrode active material composition.

Figure 2:
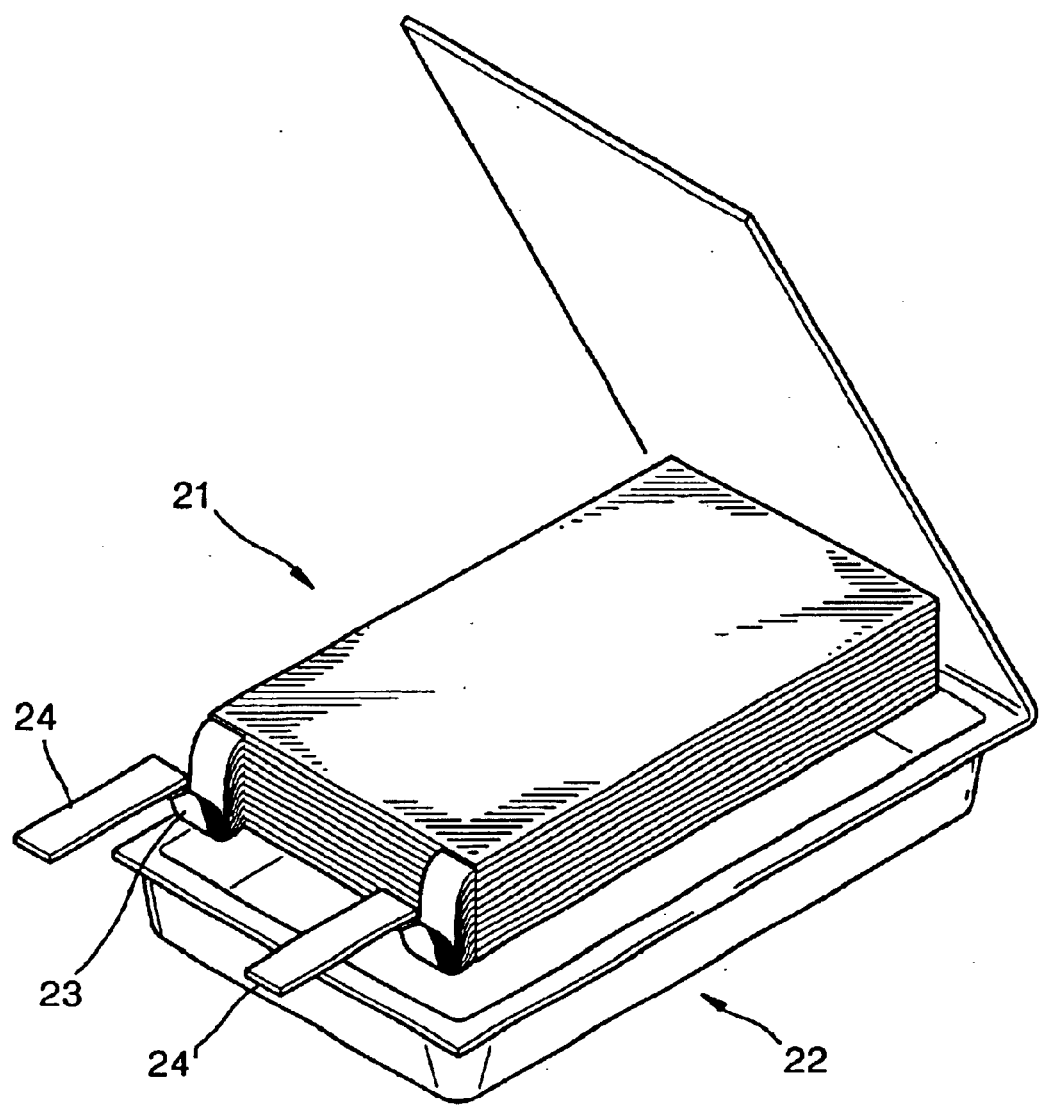
FIG. 2 is an exploded perspective view illustrating an example of a general lithium ion polymer battery.

The separator of the present invention is not specifically limited, and usable separators include an easily windable polyethylene separator, polypropylene separator and combinations thereof, which are insulating resin sheets. The separator is interposed between the cathode and anode plates prepared in the above-described manner, and wound by a jelly-roll method to form an electrode assembly (FIG. 1) or a bi-cell electrode assembly (FIG. 2). Subsequently, the electrode assembly is put into a pouch. Here, the separator of the present invention is not specifically limited to a separator having a network structure so as to impregnate the electrolyte forming composition.

Subsequently, the bi-cell electrode assembly is put into the pouch. Thereafter, the terpolymer having a repeating unit represented by formula (1), a repeating unit represented by formula (2) and a repeating unit represented by formula (3) is dissolved in a low boiling point organic solvent and then a lithium salt and an organic solvent are added thereto, thereby obtaining an electrolyte forming composition.

Thereafter, the electrolyte forming composition is injected into the battery pouch. Only the low boiling point organic solvent is removed from the resultant material under a vacuum condition to obtain a polymeric gel electrolyte, and then the pouch is hermetically sealed, thereby completing the lithium battery.

As described above, if the electrolyte forming composition is gelled, the safety and reliability can be prevented from decreasing due to leakage of the electrolytic solution.

In addition to the above description, in the lithium battery according to the present invention, the gel electrolyte can be prepared in the following manners.

In the pouch where the electrolyte forming composition contains a terpolymer having a repeating unit represented by formula (1), a repeating unit represented by formula (2) and a repeating unit represented by formula (3), a low boiling point organic solvent, a lithium salt, and an organic solvent, the composition is coated on at least one of a cathode, an anode, and a separator. The low boiling point organic solvent is then removed from the resultant material, thereby obtaining a gel electrolyte.

The present invention will now be described through the following examples, and is not limited thereto.

EXAMPLE 1

15 g of polyvinylidenefluoride was added to 600 ml of acetone and mixed using a ball mill for about 2 hours to be dissolved. 470 g of $LiCoO_2$ and 15 g of SUPER-P∩ brand carbon black (sold by 3M Carbon Company) were added to the resulting mixture and then mixed for about 5 hours to form a cathode active material composition.

The cathode active material composition was coated on an aluminum foil having a thickness of about 147 $\mu$m and a width of about 4.9 cm, using a doctor blade having a gap of about 320 $\mu$m. Then it was dried to form a cathode plate. Then, an anode plate was manufactured as follows.

50 g of polyvinylidenefluoride was added to 600 ml of acetone and mixed using a ball mill for about 2 hours to be dissolved. Next, 449 g of mezocarbon fiber (MCF) and 1 g of oxalic acid for enhancing the adhesion between a current collector and an active material layer for an anode were added to the mixture and mixed for about 5 hours to form an anode active material composition. The anode active material composition was coated on a copper foil having a thickness of about 178 $\mu$m and a width of about 5.1 cm using a doctor blade having a gap of about 420 $\mu$m, and then dried to form an anode plate.

Separately from the above, a polyethylene separator (Asahi Chemical Industry Co., Ltd.) was used as a separator. Here, the width of the separator was about 5.35 cm and the thickness thereof was about 18 $\mu$m. The polyethylene separator was interposed between the cathode and anode plates, and wound by a jelly-roll method to form an electrode assembly. The electrode assembly was then put into a pouch. Then, 1 g of a terpolymer (Daiso Co., Ltd.) containing a repeating unit represented by formula (1) (ethylene oxide), a repeating unit represented by formula (2), (n is 2 and R is a methyl group) and a repeating unit represented by formula (3) (allyl glycidyl ether) (the terpolymer having a weight-average molecular weight of $1 \times 10^6$, a molar ratio of a repeating unit represented by formula (1): repeating unit represented by formula (2): repeating unit represented by formula (3) of 80:18:2), and a glass transition temperature of −70° C. was dissolved in 100 ml of acetone, and then 30 g of a mixed solution containing 1M $LiPF_6$ and EC/PC in a mixture ratio by volume of 1:1 was added thereto and mixed. Further, 50 ml of acetone was added to the mixture and diluted to obtain an electrolyte forming composition. 20 ml of this formed composition was injected into the pouch battery, and then acetone was evaporated under a vacuum condition to prepare a polymeric gel electrolyte. Then, the resultant was hermetically sealed, thereby completing a lithium secondary battery.

EXAMPLE 2

A lithium secondary battery was completed in the same manner as Example 1, except that a mixed solution containing 1M $LiPF_6$ and EC/PC/VC in a mixture ratio by volume of about 4:4:2 was used, instead of the mixed solution containing 1M $LiPF_6$ and EC/PC in a mixture ratio by volume of 1:1.

EXAMPLE 3

1 g of a terpolymer (Daiso Co., Ltd.) containing a repeating unit represented by formula (1) (ethylene oxide), a repeating unit represented by formula (2) (n is 2 and R is a methyl group), and a repeating unit represented by formula (3) (allyl glycidyl ether), the terpolymer having a weight-average molecular weight of $1 \times 10^6$ (a repeating unit represented by formula (1): repeating unit represented by formula (2): repeating unit represented by formula (3) molar ratio of 80:18:2), and a glass transition temperature of −70° C. was dissolved in 100 ml of acetone. Then 30 g of a mixed solution containing 1M $LiPF_6$ and EC/PC in a mixture ratio by volume of about 1:1 was added thereto and mixed. Further, 50 ml of acetone was added to the mixture and diluted to obtain an electrolyte forming composition. Then, 20 ml of the formed composition was coated on the cathode and anode plates prepared in Example 1.

Next, a polyethylene separator was interposed between the cathode plate and the anode plate and then laminated to form an electrode assembly. The electrode assembly was put into a pouch, and then acetone was evaporated under a vacuum condition. Then, the resultant was hermetically sealed, thereby completing a lithium secondary battery.

COMPARATIVE EXAMPLE

A 1.15M solution containing 1M $LiPF_6$ and EC/DMC/DEC (Ube Industries, Ltd.) in a mixture ratio by volume of 3:3:4 was injected into the pouch battery prepared in Example 1 as an electrolytic solution, instead of an electrolyte forming composition. Then, the resultant was hermetically sealed to complete a lithium secondary battery.

In the lithium secondary batteries prepared in Examples 1–3 and the Comparative Example, the battery reliability and safety were evaluated. Here, the reliability of a battery was evaluated by observing a change in the characteristic of the battery after standing at 80° C. for 4 days, and the safety was evaluated by performing an overcharging piercing test.

The evaluation tests showed that the reliability and safety of the lithium secondary batteries prepared in Examples 1–3 were better than those of the battery prepared by the Comparative Example. This is because use of a gel electrolyte prevents the electrolyte from being leaked outside, or prevents the electrode assembly or pouch from being swollen due to the electrolyte, thus causing the possibility of decreasing the reliability and safety of the battery.

According to the present invention, a lithium battery which can prevent the reliability and safety of the battery from decreasing can be attained by using a gel electrolyte, by which a swelling phenomenon due to an electrolytic solution, can be effectively suppressed. Further, leakage of the electrolytic solution can be prevented.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. A lithium battery comprising:
   an electrode assembly having a cathode, an anode and a separator interposed between the cathode and the anode,
   a polymeric gel electrolyte prepared by a process comprising:
      preparing a solution by dissolving a terpolymer having a repeating unit represented by formula 1, a repeating unit represented by formula 2 and a repeating unit represented by formula 3 in a first organic solvent having a boiling point of 150° C. or less,

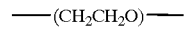

Formula 1

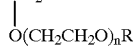

Formula 2

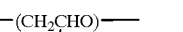

Formula 3 wherein n is an integer from 1 to 12 and R is an alkyl having 1 to 12 carbon atoms,
mixing a lithium salt and a second organic solvent with the solution to obtain a composition for forming an electrolyte,
sandwiching the polymeric gel electrolyte and the separator between the cathode and the anode to form a sandwiched structure, and
removing the first organic solvent from the sandwiched structure, wherein the separator is formed of an insulating resin sheet and the insulating resin sheet is made of polyethylene, polypropylene or a combination thereof.

2. The lithium battery according to claim 1, wherein the polymeric gel electrolyte is present between the separator and the cathode and between the separator and the anode.

3. The lithium battery according to claim 1, wherein the first and second organic solvents are different organic solvents.

4. The lithium battery according to claim 1, wherein the boiling point of the first organic solvent is in the range of 50° C. to 100° C.

5. The lithium battery according to claim 1, wherein the terpolymer contains
   0.1 to 0.9 mol of the repeating unit represented by formula 1,
   0.1 to 0.8 mol of the repeating unit represented by formula 2, and
   0.01 to 0.8 mol of the repeating unit represented by formula 3.

6. The lithium battery according to claim 1, wherein the weight average molecular weight of the terpolymer is 10,000 to 2,000,000.

7. The lithium battery according to claim 1, wherein the ratio of the weight of the terpolymer to the total weight of the lithium salt and second organic solvent is in the range from 1:1 to 1:50.

8. The lithium battery according to claim 1, wherein
   the lithium salt is at least one salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$), and
   the second organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

9. The lithium battery according to claim 1, wherein the first organic solvent is acetone or tetrahydrofuran.

10. The lithium battery according to claim 1, wherein the electrode assembly is a winding assembly electrode assembly, and the case accommodating the electrode assembly is a pouch.

11. The method according to claim 10, wherein the sandwich structure is formed by coating the composition for forming an electrolyte on at least one of the cathode, the anode and the separator.

12. A method of manufacturing a lithium battery comprising:
    obtaining a composition for forming an electrolyte by a process comprising:
       preparing a solution by dissolving a terpolymer having a repeating unit represented by formula 1, a repeating unit represented by formula 2 and a repeating unit represented by formula 3 in a first organic solvent having a boiling point of 150° C. or less, and

Formula 1

Formula 2

Formula 3

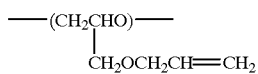

wherein n is an integer from 1 to 12 and R is an alkyl having 1 to 12 carbon atoms, mixing a lithium salt and a second organic solvent with the solution;

forming a sandwich structure by sandwiching a separator and the composition for forming an electrolyte between a cathode and an anode; and removing the first organic solvent from the sandwich structure.

13. The method of claim 12, wherein the composition for forming an electrolyte is formed between the anode and the separator and between the cathode and the separator.

14. The method of according to claim 12, wherein the sandwich structure is formed by:

inserting the cathode, the anode and the separator into a case, and injecting the composition for forming an electrolyte into the case.

15. The method according to claim 14, further comprising hermetically sealing the case after removing the first organic solvent from the sandwich structure.

16. The method according to claim 12, wherein the first and second organic solvents are different organic solvents.

17. The method according to claim 12, wherein the boiling point of the first organic solvent is in the range of 50° C. to 100° C.

18. The method according to claim 12, wherein the terpolymer contains 0.1 to 0.9 mol of the repeating unit represented by formula 1, 0.1 to 0.8 mol of the repeating unit represented by formula 2, and 0.01 to 0.8 mol of the repeating unit represented by formula 3.

19. The method according to claim 12, wherein the weight average molecular weight of the terpolymer is 10,000 to 2,000,000.

20. The method according to claim 12, wherein the ratio of the weight of the terpolymer to the total weight of the lithium salt and the second organic solvent is in the range of from 1:1 to 1:50.

21. The method according to claim 12, wherein the lithium salt is at least one salt selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$), and the second organic solvent is at least one solvent selected from the group consisting of propylene carbonate (PC), ethylene carbonate (EC), dimethyl carbonate (DMC), methylethyl carbonate (MEC), diethyl carbonate (DEC) and vinylene carbonate (VC).

22. The method according to claim 12, wherein the first organic solvent is acetone or tetrahydrofuran.

23. The method according to claim 12, wherein the separator is formed of an insulating resin sheet formed of polyethylene, polypropylene or a combination thereof.

* * * * *